(12) United States Patent
Weidmann et al.

(10) Patent No.: US 11,781,911 B2
(45) Date of Patent: Oct. 10, 2023

(54) OPTICAL MULTI-PASS CELLS

(71) Applicant: United Kingdom Research and Innovation, Swindon (GB)

(72) Inventors: Damien Weidmann, Oxfordshire (GB); Johnny Chung Leung Chu, Oxfordshire (GB)

(73) Assignee: United Kingdom Research and Innovation, Swindon (GB)

( * ) Notice: Subject to any disclaimer, the term of this patent is extended or adjusted under 35 U.S.C. 154(b) by 110 days.

(21) Appl. No.: 17/264,436

(22) PCT Filed: Jul. 1, 2019

(86) PCT No.: PCT/GB2019/051863
§ 371 (c)(1),
(2) Date: Jan. 29, 2021

(87) PCT Pub. No.: WO2020/030885
PCT Pub. Date: Feb. 13, 2020

(65) Prior Publication Data
US 2021/0310866 A1    Oct. 7, 2021

(30) Foreign Application Priority Data

Aug. 6, 2018 (GB) ..................... 1812766
Nov. 30, 2018 (GB) ..................... 1819548

(51) Int. Cl.
G01J 3/42 (2006.01)
G01J 3/02 (2006.01)
G01N 21/35 (2014.01)

(52) U.S. Cl.
CPC ............... *G01J 3/42* (2013.01); *G01J 3/021* (2013.01); *G01N 21/35* (2013.01); *G01J 2003/423* (2013.01); *G01J 2003/425* (2013.01)

(58) Field of Classification Search
CPC ........ G01J 3/42; G01J 3/021; G01J 2003/423; G01J 2003/425; G01N 21/35; G01N 2201/0668; G01N 21/031
See application file for complete search history.

(56) References Cited

U.S. PATENT DOCUMENTS 5,220,402 A    6/1993   Harvey
6,486,474 B1 * 11/2002  Owen ................ G01J 3/0208
                                                    356/244

(Continued)

FOREIGN PATENT DOCUMENTS

JP    H09-049793 A    2/1977
JP    S52-117175 A   10/1977

(Continued)

OTHER PUBLICATIONS

Anthony E. Siegman, "Lasers", 1986, Chapter 20, University Science Books.

(Continued)

*Primary Examiner* — Marcus H Taningco
(74) *Attorney, Agent, or Firm* — LEMPIA SUMMERFIELD KATZ LLC

(57) ABSTRACT

The disclosure relates to an infrared spectrometer comprising first and second opposing reflectors spaced apart by a spacing length, and a plurality of discrete concave reflecting facets, the reflecting facets being facets of at least one of the opposing reflectors. An infrared laser source is arranged to form a laser beam. The opposing reflectors are arranged such that the laser beam is reflected alternately from each of the opposing reflectors, including being reflected at least once by each of the reflecting facets. A detector is arranged to detect spectral properties of the laser beam after reflection from each of the plurality of reflecting facets, and an analyser then determines properties of a sample disposed (Continued)

between the first and second opposing reflectors from the detected spectral properties.

37 Claims, 9 Drawing Sheets

(56) References Cited

U.S. PATENT DOCUMENTS

| | | | |
|---|---|---|---|
| 8,508,740 B2 | 8/2013 | Richter | |
| 2006/0232772 A1 | 10/2006 | Silver | |
| 2007/0242275 A1* | 10/2007 | Spartz | G01N 21/031 356/451 |
| 2010/0201977 A1 | 8/2010 | Milosevic et al. | |
| 2012/0170112 A1* | 7/2012 | Sandstrom | G02B 17/004 359/347 |
| 2012/0242989 A1 | 9/2012 | So et al. | |
| 2014/0319352 A1* | 10/2014 | Gupta | G01N 21/39 250/339.07 |
| 2015/0241339 A1 | 8/2015 | Maksyutenko et al. | |
| 2015/0377767 A1 | 12/2015 | Chiesi et al. | |

FOREIGN PATENT DOCUMENTS

| | | |
|---|---|---|
| JP | 2006337861 A | 12/2006 |
| JP | 2009-047612 A | 3/2009 |
| JP | 2010-286289 A | 12/2010 |
| JP | 2014-194433 A | 10/2014 |
| RU | 2372606 C1 | 11/2009 |
| WO | 2009101374 A1 | 8/2009 |
| WO | 2011058330 A1 | 5/2011 |
| WO | 2015022494 A1 | 2/2015 |
| WO | 2017137502 A1 | 8/2017 |
| WO | 2018078384 A1 | 5/2018 |

OTHER PUBLICATIONS

Fraunhofer Institute for Physical Measurement Technologies IPM, Product Information "Multi reflection gas measurement cells for absorption spectroscopy, White and Herriott Cells", bears copyright date Jun. 2012.
Gail Overton, "Metrology: New Multipass Gas Cells Beat Conventional Designs", Laser Focus World, Aug. 8, 2013, 3 pages.
GB Search Report in Application No. GB1812766.2, dated Jan. 28, 2019, 2 pages.
GB Search Report in Application No. GB1819548.7, dated May 24, 2019, 2 pages.
International Search Report and Written Opinion in International Patent Application No. PCT/GB2019/051863, dated Sep. 30, 2019, 9 pages.
Machine Translation of Japanese Office Action from Japanese Application No. 2021-506497, dated Apr. 15, 2022, JP.
Office Action from Japanese Application No. 2021-506497, dated Apr. 15, 2022, JP.
Examination Report from European Patent Application No. 19 736 473.0, dated Oct. 5, 2022, 4 pages.

* cited by examiner

OPTICAL MULTI-PASS CELLS

RELATED APPLICATIONS

The present patent document is a § nationalization of PCT Application Serial No. PCT/GB2019/051863, filed Jul. 1, 2019, designating the United States, which is hereby incorporated by reference, and this patent document also claims the benefit of United Kingdom Application Nos. GB 1812766.2, filed Aug. 6, 2018 and GB 1819548.7, filed Nov. 30, 2018, which are also hereby incorporated by reference.

The present invention relates to optical multi-pass cells, for example for use in infrared spectrometry techniques such as infrared absorption spectrometry.

INTRODUCTION

Optical multi-pass cells provide for the repeated reflection of a light beam through a space. They may be used for a variety of purposes such as optical delay lines and laser spectrometry. For example, in the case of infrared spectrometry, it may be desirable to increase the path length through which a laser beam is passed through a sample in order to increase the effects of the sample on the laser beam. Such effects may include absorption of particular laser beam wavelengths, as in infrared absorption spectrometry, or other effects such as small changes in wavelength or line width of spectral features.

For some applications it is desirable to be able to provide an optical multi-pass cell which is more compact in terms of length and/or width of the cell, and to provide a multi-pass cell which is more stable, easier to manufacture and so forth. At the same time, it is generally desirable to minimise unwanted optical losses of the laser beam within the multi-pass cell. Such losses may occur, for example, through lower than ideal reflectivity of reflecting facets within the cell and other effects.

The invention addresses problems and limitations of the related prior art.

SUMMARY OF THE INVENTION

The invention seeks to provide a compact multi-pass cell suitable for applications such as laser spectrometry, including infrared, for example infrared absorption or dispersion spectroscopy, although the cell may be used for various other applications as described below. Typically, such a cell comprises at least first and second opposing reflectors each having a plurality of reflective facets, and/or planar reflecting portions, as variously described below, and the cell may for example be taken to be a combination of these reflectors and the space between the reflectors which is used for multiple passes of a laser beam between the facets. If required the cell may then also include walls arranged to retain a sample, typically of a gas, at least in the space between the reflectors, for suitable optical analysis, although a sample gas may be present between the reflectors in an open cell arrangement without partial of full containment by walls if required.

Aspects of the invention are related to and informed by numerical modelling of multi-facetted optics to promote higher confinement of a laser beam between the reflectors, for example by decreasing incidence of the laser beam outside of defined reflective facet surfaces.

In particular, according to one aspect the invention provides an infrared spectrometer comprising: first and second opposing reflectors spaced apart by a spacing length, each reflector comprising a plurality of discrete concave reflecting facets; an infrared laser source arranged to form a laser beam; the reflecting facets of the first and second reflectors being arranged such that the laser beam is reflected at least once from each of a plurality of the reflecting facets, by reflecting alternately from a reflecting facet of each of the first and second opposing reflectors; a detector arranged to detect spectral properties of the laser beam after reflection from the plurality of the reflecting facets; and an analyser arranged to determine properties of a sample disposed between the first and second opposing reflectors from the detected spectral properties. The sample may typically be a gas, liquid, or other fluid, although other sample types may be used.

According to another aspect the invention provides an infrared spectrometer comprising: first and second opposing reflectors spaced apart by a spacing length; a plurality of discrete concave reflecting facets, the reflecting facets being facets of at least one of the opposing reflectors; an infrared laser source arranged to form a laser beam; the opposing reflectors being arranged such that the laser beam is reflected alternately from each of the opposing reflectors, including being reflected at least once by each of the reflecting facets; a detector arranged to detect spectral properties of the laser beam after reflection from each of the plurality of reflecting facets; and an analyser arranged to determine properties of a sample disposed between the first and second opposing reflectors from the detected spectral properties.

In either aspect, the discrete concave reflecting facets may be considered discrete in the sense that each such facet is discontinuous with adjacent facets. This might be expressed for example by stating that convex curvature is required between adjacent concave facets, although that concave curvature may be provided in the form of convex edges and/or more slowly curving convex forms.

The invention may also be used for applications outside of infrared spectrometry, so more generally the invention may provide a multi-pass cell comprising first and second opposing reflectors spaced apart by a spacing length, each reflector comprising a plurality of discrete concave reflecting facets, the reflecting facets of the first and second reflectors being arranged such that a beam of light such as a laser beam, for example an infrared laser beam, is reflected at least once from each of a plurality of the reflecting facets, by reflecting alternately from a reflecting facet of each of the first and second opposing reflectors. Relevant more detailed aspects of the invention and embodiments described herein should then also be taken to apply to such a multi-pass cell where appropriate as well as more specifically to an infrared spectrometer. Alternatively such a multi-pass cell may comprise first and second opposing reflectors spaced apart by a spacing length; a plurality of discrete concave reflecting facets, the reflecting facets being facets of at least one of the opposing reflectors, the reflecting facets being arranged such that a beam of light such as a laser beam, for example an infrared laser beam, is reflected alternately from each of the opposing reflectors, including being reflected at least once by each of the reflecting facets.

The spacing length mentioned above may for example be taken to be a spacing along an optical axis between the opposing reflectors, and as necessary may be defined as a perpendicular spacing between planes defining the mean surfaces of the facets or similar.

The number of reflecting facets of the first and second reflectors from which the laser beam is reflected may be chosen according to the specific application and required design, but typically the design may provide for the number of facets from which the laser beam will be reflected may be at least three or at least six, and optionally no more than 100 or no more than 400, or more particularly from ten to sixty. The pattern of reflecting facets across the face of each reflector may also be chosen according to design requirements, for example being distributed in a rectilinear or hexagon grid.

In some embodiments, each of the reflections of the laser beam before a subsequent reflection from the opposing reflector is a reflection from a reflecting facet, with the reflecting facets therefore being provided on both of the reflectors.

In other embodiments, at least one of the reflections of the laser beam between the opposing reflectors may be a reflection from a planar reflecting portion of one of the reflectors. Such planar reflecting portions may be provided on just one or on both of the reflectors.

In some embodiments, all of the reflecting facets are disposed on only one of the reflectors, and the reflections of the laser beam at the other, opposing, reflector are from one or more planar reflecting portions of that other reflector. For example the other reflector may present a single planar surface for all of the laser beam reflections. In such circumstances that other reflector may conveniently be provided by a planar mirror. In some embodiments such a single planar surface or mirror could be replaced by a curved mirror of suitably large radius of curvature or by a reflecting surface of some other form.

Each of the reflecting facets may be substantially of spherical curvature, and each may have the same radius of curvature, or substantially the same radius of curvature for example all within a range of about 1% from each other. Such spherical arrangements may make design and manufacture of embodiments more straightforward. However, at least slightly aspheric surfaces may be used in which case references to radius of curvature in this document may be understood for example in terms of average radius of curvature, radius of curvature at a central point of a facet, or in other suitable ways. In other embodiments, facets with different radii of curvature may be used.

Each of the reflecting facets may have the same radius of curvature, and such a radius of curvature may be a multiple of the spacing length, wherein the multiple is one of: ⅔, 1 and 2. Such a multiple need not be exact, for example the radius of curvature may be within +−5% or +−10% of such a multiple. In other examples, the radii of curvature of the facets may differ slightly for example with a range mentioned above, or more substantially.

These multiples may be particularly advantageous for concave facets which reflect the laser beam to a concave reflecting facet of the opposing reflector. Where the opposing reflector provides instead a planar reflecting surface for reflection of the laser beam back to a concave reflecting facet of the first reflector, the radius of curvature of the first facet may instead be a multiple of the spacing length which is one or 4/3, 2 or 4, or for example within +−5% or +−10% of such a multiple.

The apparatus may be arranged such that the laser beam forms a plurality of beam waists during reflection between the first and second reflectors, for example once for each reflection from a facet, or at least once for every two or at least once for every three reflections. Such beam waists may be described as bringing the laser beam to a focus at that point, and control of these multiple focus points is used in design of the reflectors and their facets to minimise loss of the laser beam through incidence outside the area of each particular facet.

For example, the apparatus including the reflective facets may be configured such that the laser beam forms a plurality of beam waists in reflections between consecutive reflecting facets in the beam path of the first and second opposing reflectors, each of the beam waists being spaced from both of the reflectors by at least 10%, and more preferably by at least 20% of the spacing length.

If a next reflection will be from a planar reflecting portion of the opposing reflector, then a reflecting facet may be are configured such that the laser beam forms a beam waist at or proximal to that next reflection and planar reflecting portion, wherein proximal to the opposing reflector is optionally within 20%, or optionally within 10% of the spacing length from that opposing reflector.

The infrared spectrometer may further comprise conditioning optics arranged to form a waist in the laser beam before a first reflection from any of the reflecting facets. In particular such a waist may be located between the first and second reflectors, and may be positioned to assist in minimising the loss of the laser beam through incidence outside the surface area of some or all of the reflecting facets.

Each reflecting facet may have a diameter for example from about 1 to 6 mm. The spacing length may be for example from about 30 mm to 300 mm.

When the multi-pass cell is used for an infrared laser beam, and for the described infrared spectrometer, the laser beam may have a wavelength of between 2000 and 20,000 nm. Note that because a laser beam can typically be described by Gaussian optics, the reflection and development of such a beam is dependent on wavelength, the laser wavelength is highly relevant to the design of the apparatus, for example in terms of curvature of, size of, and spacing between the reflective facets.

The reflectors may be designed to provide various combinations of single and/or multiple reflections of one or more configurations of laser beam from all or overlapping or discrete subsets of the reflective facts. However, in some embodiments the reflecting facets of the first and second reflectors may be arranged such that the laser beam is reflected once and only once from each of a plurality, or from each of all, of the reflecting facets.

At least one of the reflecting facets and/or planar reflecting portions may be constructed to be partially reflecting and partially transmitting, so that a first portion of the laser beam continues on to reflection from a second subset of reflecting facets and subsequent detection by the detector, and second portion of the laser beam is transmitted through the partially transmitting facet or planar portion for detection by the, or another, detector after reflection from only a first subset of the reflecting facets. For example, the ratio of reflection to transmission may be around 50:50, or some other ratio as desired and discussed below. In such arrangements using at least one partially reflecting facet or planar portion, the first and second subsets of facets may be mutually exclusive.

The infrared spectrometer may further comprise a spatial filtering mask located between the opposing reflectors, and arranged to reduce the proportion of the laser beam which is incident outside of the intended reflecting facet at each reflection, noting that the profile of the laser beam will typically be Gaussian or similar. In particular, the spatial filtering mask may comprise a plurality of apertures formed in a material which blocks portions of the laser beam which would otherwise be incident outside the intended next reflecting facet.

For example, the spatial filtering mask may comprise a plurality of apertures each arranged to permit at least a portion of the laser beam directed to the corresponding next reflecting facet in the path of the laser beam to arrive at that next reflecting facet, the spatial filtering mask being arranged to block at least a portion of the laser beam which would otherwise be incident outside the next reflecting facet.

The reflecting facets and spatial filtering mask may be configured such that the laser beam forms a plurality of beam waists during reflection between the first and second reflectors which are at or proximal to the spatial filtering mask. For example, if the radius of curvature of each reflecting facet is approximately the same as the separation distance between the opposing reflectors then the infrared spectrometer can be arranged to form the beam waists in the centre of the cell between the opposing reflectors, and the spatial filtering mask can also then be located in the centre of the cell between the opposing reflectors.

If all of the reflecting facets are provided on a first of the reflectors, and only planar reflection is used at the other, second reflector, then the reflecting facets may be configured such that the laser beam forms a plurality of beam waists during reflection at or proximal to the second reflector, and a spatial filtering mask may be provided at or proximal to that second reflector.

For each reflector, a plurality, for example more than 80%, or all of the reflecting facets (and optionally also any planar reflecting portions) may be formed together, or integrally formed, on a single piece of a material, for example by moulding as a single piece, or by diamond milling, laser ablation or some other cutting process from a single piece of material. Note, however, that coatings may also be applied to such a single piece of material. For example, at least some or all of the reflecting facets may be coated with a reflective coating. In some embodiments most of the reflecting facets may be integrally formed on a single piece of material, but some particular types of facet such as partially reflecting facets may be provided in other ways, for example using other materials bonded or otherwise mounted to the reflector.

Embodiments of the invention providing an infrared spectrometer may comprise a sample cell arranged to contain the sample in the, or a, space between the first and second opposing reflectors, such that the laser beam reflecting between the reflectors passes multiple times through the sample. Such a sample cell may be provided for example by a cell wall extending between the opposing reflectors.

One or both of the opposing reflectors may comprise one or more ports arranged such that the sample to flow into and/or out of the sample cell through the ports. For example, each of the opposing reflectors may comprise one or more said ports, and the infrared spectrometer may then be arranged to cause the sample to flow into the sample gas cell through the one or more ports in one of the reflectors, and out of the cell through the one or more ports in the other of the reflectors.

Such ports may conveniently be located between two or more adjacent reflective facets of a reflector.

The invention also provides methods of design, manufacture, and operation corresponding to the described apparatus.

For example, in one aspect the invention provides a method of operating apparatus, such as an infrared spectrometer as outlined above, the method comprising: providing first and second opposing reflectors, each reflector comprising a plurality of discrete concave reflecting facets, and directing a laser beam to pass through between the reflectors multiple times by reflecting at least once from each of a plurality of the reflecting facets, the laser beam reflecting alternately from a reflecting facet of each of the first and second opposing reflectors. A sample may be provided in a space between the opposing reflectors such that the laser beam passes through the sample multiple times, and the method may then comprise detecting spectral properties of the laser beam following the multiple reflections; and determining properties of the sample from the detected spectral properties.

In another aspect the invention provides a method of operating an infrared spectrometer, the method comprising: providing first and second opposing reflectors spaced apart by a spacing length; a plurality of concave reflecting facets, each of the reflecting facets being a facet of a said reflector; providing a sample in a space between the opposing reflectors; directing an infrared laser beam to pass through the sample multiple times by reflecting at least once from each of a plurality of the reflecting facets, the laser beam reflecting alternately from each of the opposing reflectors, including being reflected at least once by each of the reflecting facets; detecting spectral properties of the laser beam following the multiple reflections; and determining properties of the sample from the detected spectral properties.

BRIEF DESCRIPTION OF THE DRAWINGS

Embodiments of the invention will now be described, by way of example only, and with reference to the following drawings, in which.

DETAILED DESCRIPTION OF EMBODIMENTS

Figure 1:
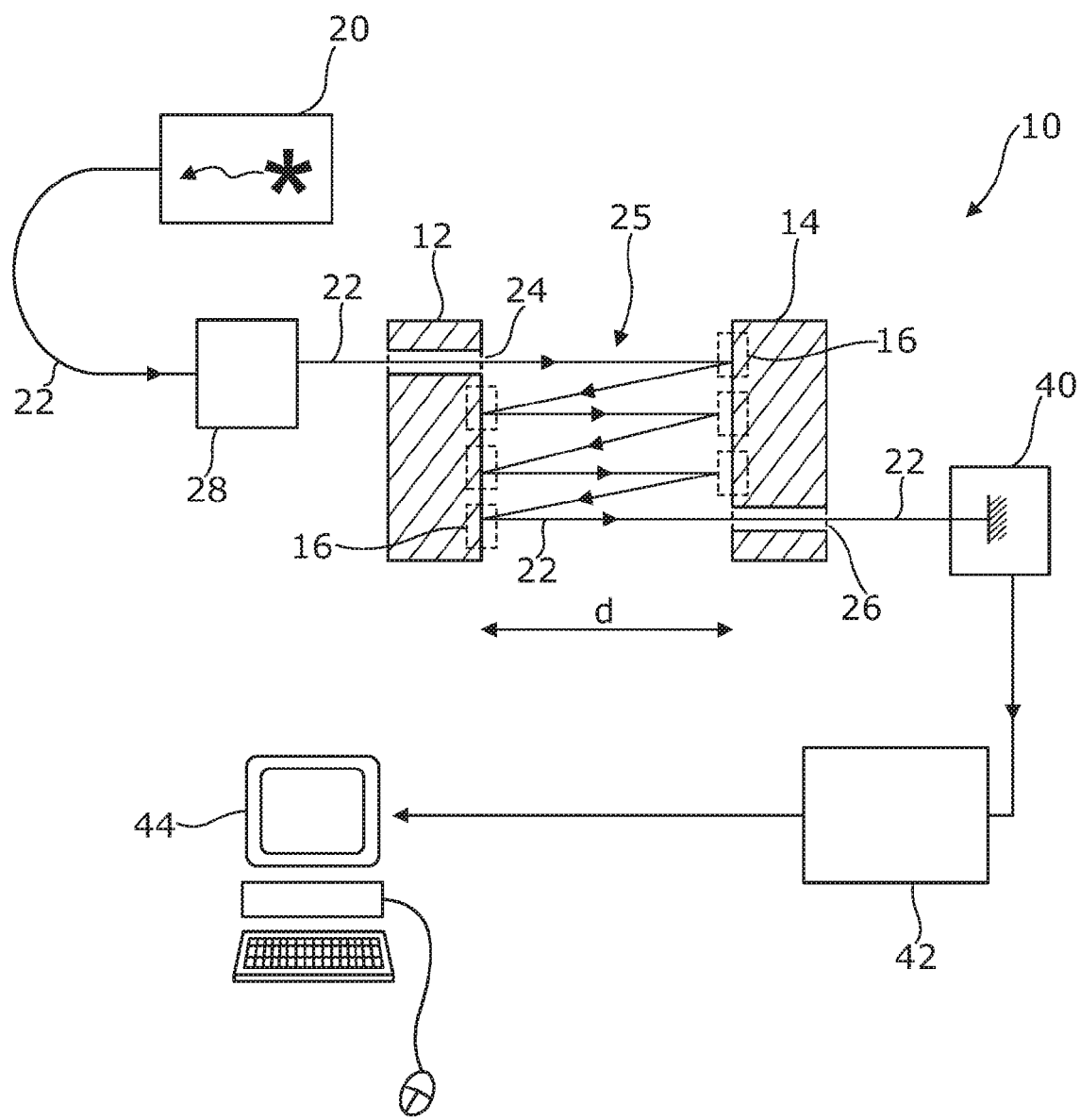
FIG. 1 illustrates an infrared spectrometer embodying the invention.

Referring to FIG. 1 there is shown schematically an infrared spectrometer 10 embodying the invention. Opposing first and second reflectors 12, 14 are spaced apart by a spacing length d. Each reflector 12, 14 comprises a plurality of discrete, concave reflecting facets 16. Note that in FIG. 1 the shapes of these facets are not shown, but instead a dotted box is shown around the region of each facet. The reflecting facets are discrete in the sense that convex curvature is required between adjacent facets, for example by way of one or more edges or more slowly curving convex areas. Although not apparent from the cross section view of FIG. 1, the reflecting facets may be distributed across the opposing face of each of the first and second reflectors in various ways, for example in a rectilinear or hexagonal grid, as a single line of facets, or in other ways.

An infrared laser source 20 is used to form a laser beam 22 which is directed so as to reflect at least once from each of a plurality of the reflecting facets 16, by reflecting alternately from a reflecting facet of each of the first and second reflectors as shown in the figure. In some embodiments, described below, some of the reflections may be from one or more planar portions of one or both of the first and second reflectors, for example with all of the concave reflecting facets being provided on one of the reflectors, and reflections from the other reflector being from a planar portion of that reflector.

After reflection from the reflecting facets 16, the laser beam 22 is incident on a detector 40 which is arranged to detect one or more spectral properties of the laser beam. If a sample 25, such as a gaseous or liquid sample, is present within at least some of the path of the laser beam 22 between the reflectors 12, 14, then the sample may affect spectral properties of the laser beam 22, for example by infrared absorption or dispersion, and the spectral properties detected at the detector 40 may therefore be used to determine properties of the sample. For example, an analyser 42 may be used to receive a signal from the detector 40 which comprises the spectral properties, and to determine the properties of the sample from that signal. Determined spectral properties and/or properties of the sample may be stored, transmitted, displayed, and/or processed further in various ways, for example by a computer system 44 receiving the relevant data from the analyser 42 as illustrated in FIG. 1.

By way of example, the laser source may be arranged to form a laser beam having a wavelength coincident with, or scanned across, one or more absorption spectral features of one or more target species to be detected in the sample. Detection of the intensity of the laser beam at the wavelengths of those absorption spectral features may then be used to infer concentrations of those target species in the sample. Typical applications for such techniques include the detection of particular gas species in human breath for clinical purposes, in atmospheric air or gases discharged from an industrial process for detection of pollution species, and so forth. Some techniques which may be used in this respect are discussed for example in WO2009/101374, WO2011/058330, and WO2018/078384, which in each case may be implemented using a sample cell defined by opposing reflectors as described herein.

Since such species to be detected within a sample 25 are frequently at low concentrations and therefore difficult to detect with good accuracy or sufficiently quickly using infrared absorption spectroscopy, the use of multiple reflecting facets provides a longer path length of the laser beam 22 through the sample and therefore a higher degree of infrared absorption or dispersion for detection of the target species.

The laser source may form a laser beam which is in the infrared spectrum, or more particularly in the mid infrared spectrum, for example with a wavelength of between about 2,000 nm and 20,000 nm. The laser source may form a laser beam which scans across a range of wavelengths, in order to encompass more than one spectral feature such as a plurality of absorption lines. Typically, a wavelength scan range may be used of about 1 to 3 $cm^{-1}$ when detection of a particular spectral feature, or of up to about 100 $cm^{-1}$ when detection of a wider spectral range, is needed, for example using various types of semiconductor based lasers such as intra band cascade lasers or quantum cascade lasers, or optical parametric oscillation lasers, or external cavity lasers.

The laser beam 22 may be directed to undergo a first reflection at a first reflecting facet, or planar reflecting portion, on the second reflector 14 through an entrance aperture 24 in the first reflector 12. This entrance aperture may be closed to the passage of gas or liquid by a window (not shown in this figure). Following reflection from a plurality of the reflecting facets 16 the laser beam may then exit through an exit aperture 26 in the first or second reflector (exit through the second reflector 14 is shown in FIG. 1), which may also be closed to the passage of gas or liquid by a window.

The infrared laser beam 22 may typically be in the form of a Gaussian beam, in other words dominated by a fundamental TEM00 transverse Gaussian mode with a Gaussian intensity profile across the beam, although some other beam components will typically be present to some degree, which can for example be expressed as Hermite-Gaussian or Laguerre-Gaussian modes. In accordance with usual Gaussian beam principles and properties, the geometry of the laser beam can therefore be approximately defined by a combination of its wavelength and the position and radius of the beam waist. As illustrated in FIG. 1 conditioning optics 28 may be located after the laser source 20 but before the first and second reflectors 12, 14 in order to control the geometry of the beam before the first reflection from a facet 16 by forming a suitably positioned and sized beam waist ahead of the first reflecting facet, as discussed in more detail below. Such a beam waist may preferably be formed between the first and second reflectors 12, 14.

The facets are formed and mutually arranged, along with control of the geometry of the beam approaching the facet reflection, in order to control development of the laser beam 22 as it reflects between the facets 16. In particular, the facets may be formed and arranged so as to keep the laser beam spot radius at each facet within a controlled range, with the aim of minimising the amount of light of the laser beam which is incident on the reflector outside of each intended facet, and maximising the amount of light of the laser beam which arrives at the detector 40.

In this way the sensitivity of the sensor may be increased by the use of a larger number of facets and therefore a longer laser beam path length through the sample without excessive loss of laser beam intensity through spurious reflection. This control of the laser spot size at each facet also permits smaller facets to be used, and therefore a larger number of facets to be used for a given size of reflector 12, 14. These effects may therefore be used to construct a multi-pass cell with combinations of properties of being more compact by being of lesser diameter and/or length, and being more sensitive for use in applications such as spectrometry by having a longer optical path length and/or having lower laser beam loss at the reflectors.

Typically, the number of facets 16 on each or on both reflectors in combination, and/or the number of facets for which the sensor is arranged for the laser beam to reflect from, may be in the range from about 3 or from about 6, to about 100 or to about 400, or more specifically from about 10 to about 60. Increasing the number of facets used for reflection leads to an increased path length of the laser beam through the sample, but leads to increased losses through less than 100% reflectivity at each facet, and through less than 100% of the remaining essentially Gaussian beam being incident on each subsequent facet.

In order to form a compact spectrometer, each facet may have a diameter of between about 1 mm and 10 mm. Each reflector may typically be formed with an opposing face towards the other reflector with a surface area of between about 10 mm² and 1000 mm², although other sizes could be used. The shape of each opposing facet may conveniently be round, elliptical, square or rectangular, but other shapes could be used. The spacing length between the reflectors may be chosen in consideration of the desired total laser beam path length, the number of facets available for reflection, and the available precision of the facets, but may typically be between about 30 mm and 300 mm.

Figure 2:
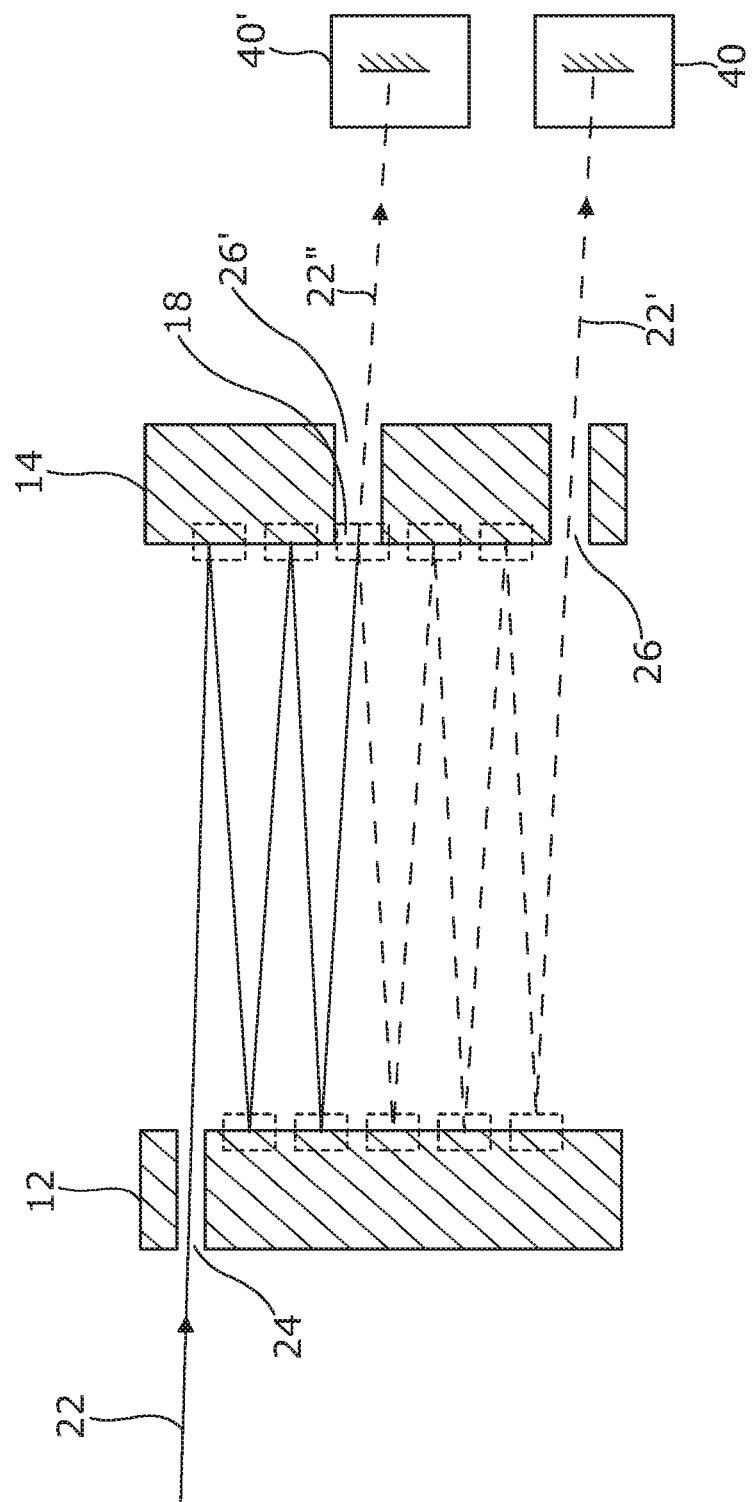
FIG. 2 shows the use of a partially reflecting, partially transmitting facet in an arrangement such as that of FIG. 1.

In some arrangements, the laser beam 22 reflects off any one facet only once, although arrangements may be envisaged where one or more of the facets are used for reflection of the laser beam 22 more than once. In some embodiments, all of the reflecting facets are used for reflecting laser beam 22 between the laser source 20 and the detector 40. However, this is not always necessary, and in some embodiments and some configurations of those embodiments a subset of the facets may be used for a particular configuration of the input laser beam 22. In some embodiments, the facets may be arranged such that more than one laser beam path between the reflectors 12, 14 is defined. For example two different reflection paths each between all or subsets of the reflectors, optionally using different entrance and/or exit apertures, and optionally using different laser beam sources and/or detectors, and optionally using the same subsets, overlapping subsets, or non-overlapping subsets of the reflectors may be used In some arrangements, the spectrometer may be arranged to provide alternative longer and shorter overall laser beam paths of reflection between the first and second reflectors, for example as shown schematically in FIG. 2. FIG. 2 shows first and second reflectors 12, 14 similar to those of FIG. 1, but in this case one of the reflective facets 16 of one of the reflectors 14 is a partially transmitting facet 18, behind which is a further exit aperture 26'. This partially transmitting facet 18 is arranged to reflect a portion of the beam 22 to continue to further reflections from facets of the reflectors as a longer path beam 22', and to transmit a portion of the beam 22 as shorter path beam 22" to be directed via the further exit aperture 26' in that reflector 14 to the detector 40, or optionally to an additional detector 40' as shown in FIG. 2, with such detector(s) and the subsequent processing of the spectral signals being as already described above. Note that although FIG. 2 shows the further exit aperture 26' to be in the same reflector 14 as the first described exit aperture 26, either of both of these apertures could be in the same reflector as the entry aperture 24.

Using such an arrangement, the reflectors can be used to provide both longer and shorter laser beam path lengths between the reflectors, with a penalty of lower beam intensity at the detector(s) after following each of the longer and shorter beam paths 22', 22". If a longer laser beam path length is likely to provide a saturated signal at the detector under some circumstances, or a signal where accuracy of the detector is compromised at higher concentrations of a sample species, then the shorter laser beam path length can then instead be used to provide a signal at the detector which is not compromised in this way or at least to a lesser extent. In other words, providing two or more different length paths in this way provides the sensor with enhanced dynamic range over different expected concentrations of a target species in the sample.

To this end, if one partially transmitting facet is provided, then it may conveniently be provided between about 5% and 60% along the path of the laser beam 22 between the first and second reflectors. If more than one partially transmitting facet is provided in order to provide more than two different lengths of beam pass then the different beam paths may be chosen accordingly.

Each partially transmitting facet may transmit between about 10% and 90% of the beam intensity incident on it, reflecting most of the rest of the beam intensity. If just one partially reflecting facet is used then it may transmit between about 40% and 60% of the beam intensity.

A partially transmitting facet 18 may be formed for example by a semi-transparent crystal or glass material in which the facet surface properties have been moulded or machined. If required, the reflection/transmission properties could be tailored using optical coatings. Examples of suitable materials include lead chalcogenide glasses, or crystal materials such as zinc selenide, calcium fluoride, and barium fluoride. The partially transmitting facet could for example be glued in position, or inserted using mounting systems.

Figure 3:
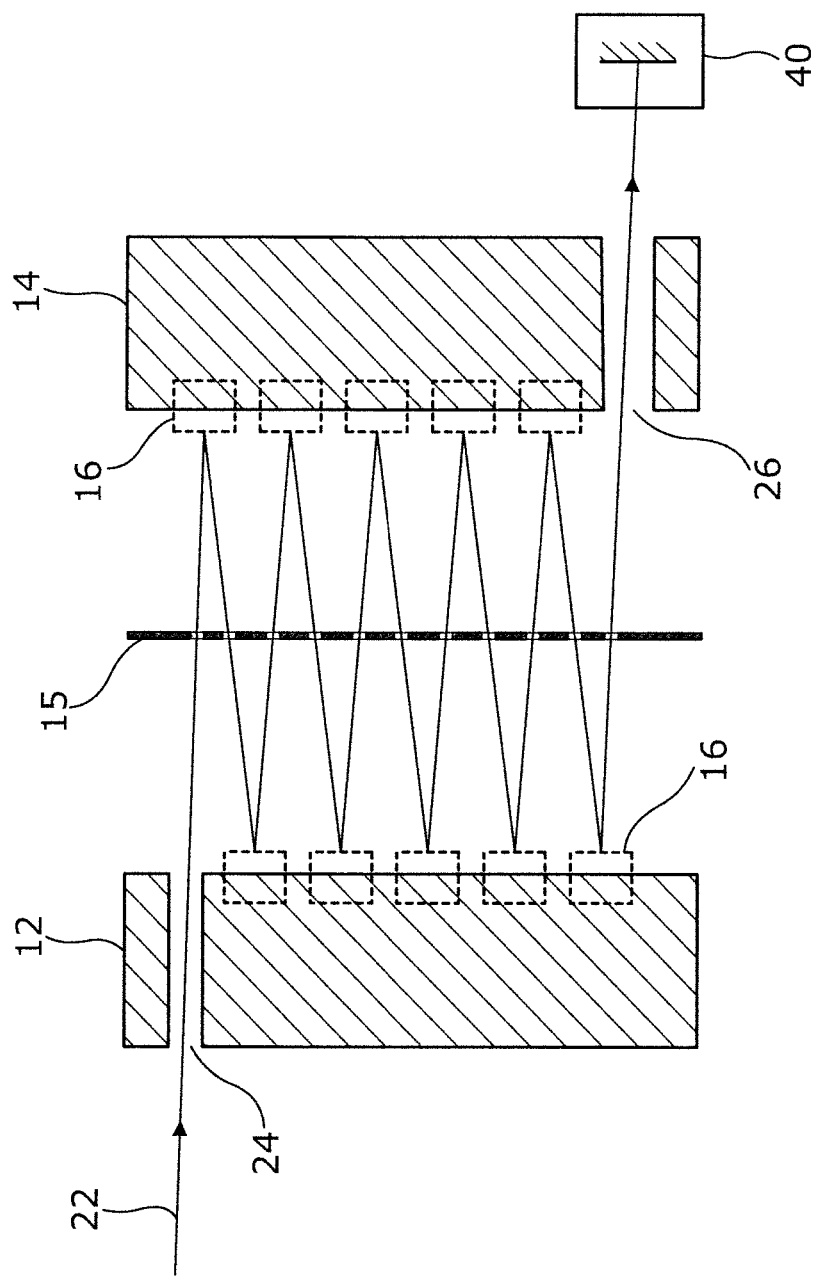
FIG. 3 illustrates the use of a spatial filter mask located between the reflective facets of the infrared spectrometer to reduce beam overlap into adjacent facets and/or other areas of the reflectors, in an arrangement such as that of FIG. 1 or 2.

In some arrangements, a spatial filtering mask 15 may be provided between the opposing reflectors 12, 14, for example as shown schematically in FIG. 3, which shows first and second reflectors 12, 14 similar to those of FIG. 1 or 2. The spatial filtering mask 15 is formed from material which is generally opaque to the laser beam 22, and may be constructed or coated so as to enhance absorption of the laser beam where incident on the mask and therefore to minimise scattering of stray laser beam light. The spatial filtering mask 15 comprises a plurality of apertures through the material of the mask, each aperture being arranged to permit a main or central portion of the laser beam 22, in each of some or all of the paths from one reflector to the other, to pass through the mask, and in particular a portion of the laser beam which will be incident on the next reflective facet in the path of the beam, while blocking some or all of the portion of the laser beam 22 which will be incident on the body of the reflector outside of the next reflective facet, or outside a particular portion of the next reflective facet.

In this way, the spatial filtering mask 15 can be used to reduce or eliminate scattering of the laser beam 22 from portions of the reflectors 12, 14 other than the particular facet intended for each reflection of the laser beam, such as other facets 16 or transition regions between facets. This may be particularly useful in reducing unwanted scattering of the laser beam light and thereby improving the performance of the spectrometer such as improved signal to noise ratio, bearing in mind that if the laser beam 22 is essentially Gaussian in cross section, or even of some other form, there is generally no sharp boundary of the laser beam.

The spatial filtering mask 15 illustrated in FIG. 3 may be particularly advantageous if the beam waists of an essentially Gaussian form laser beam 22 are coincident with the spatial filtering mask 15. For example, as discussed below, if the spacing length between the reflectors 12, 14 is about one times the radius of curvature of each of the reflective facets then the spectrometer may be arranged such that each beam waist forms in the centre of the space between the two opposing reflectors. The spatial filtering mask 15 can then be located coincident with or proximal to the beam waists in the centre or in a central region of the space between the two reflectors to minimise the effect of peripheral areas of the laser beam (and also stray light) being incident on the opposing reflectors other than on the intended reflective facet at each reflection.

Figure 4:
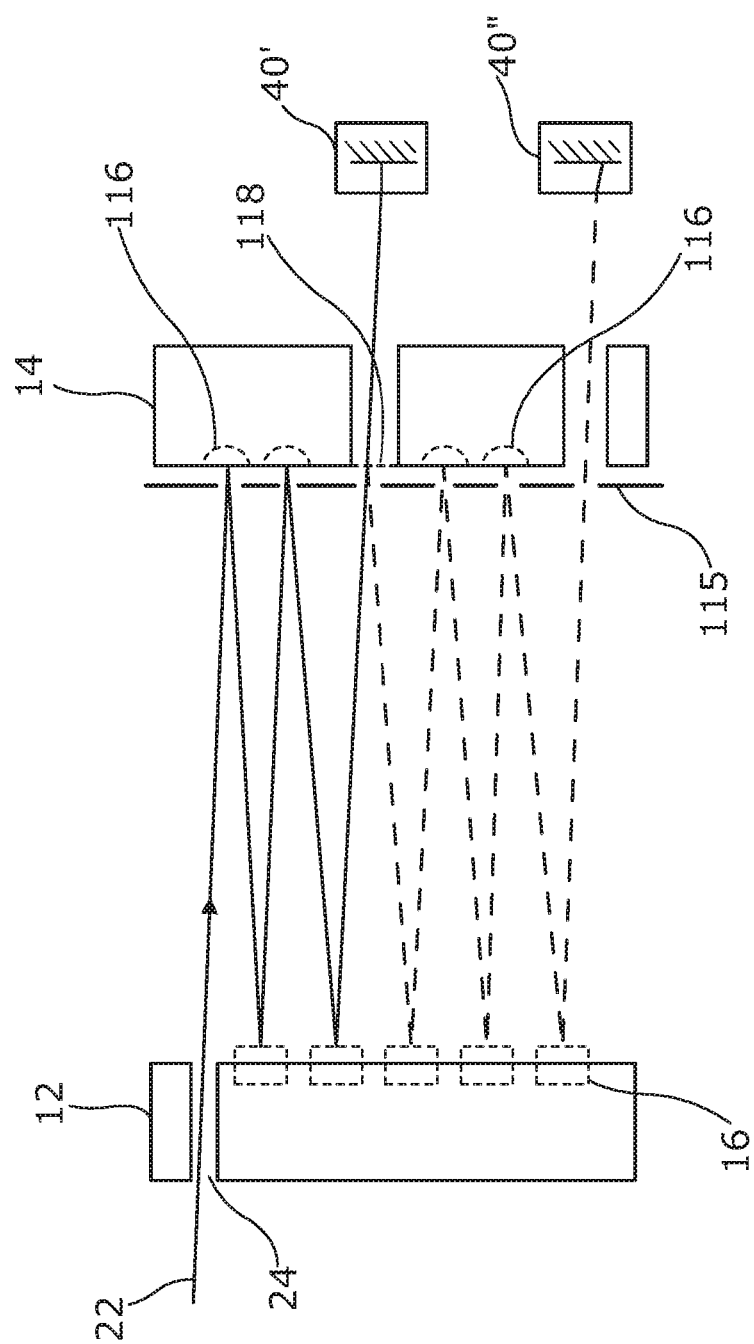
FIG. 4 shows how the reflectors of FIGS. 1 to 3 maybe implemented to include one or more planar reflecting surfaces.

As mentioned above, some of the reflections between the opposing reflectors can be from planar portions of those reflectors instead of from concave reflecting facets. FIG. 4 is similar to FIG. 2 but illustrating such an arrangement where all the reflections from the first reflector 12 are from concave reflecting facets 16 of that reflector, and all of the reflections from the second reflector are from planar reflecting portions 116 of the second reflector 14. Conveniently in such a case, all of the planar reflecting portions may be provided by a single planar surface of that reflector, and in this way one of the reflectors may for example be provided by a planar mirror thereby saving complexity of construction. Moreover, in some circumstances such a mirror need not be strictly planar. For example, a single concave or convex surface of sufficiently large radius of curvature could be used.

In arrangements where all of the concave reflecting facets are provided on a single one of the reflectors a spatial mask 115 may conveniently be provided at or proximal to the other reflector as shown in FIG. 4. The beam waists of an essentially Gaussian form laser beam 22 may then be coincident with the reflector providing the planar reflective portions and therefore also with such a spatial filtering mask 115 if provided. For example, if the spacing length between the reflectors 12, 14 is about half the radius of curvature of each of the reflective facets then the spectrometer may be arranged such that each beam waist forms at the opposing reflector. The spatial filtering mask 115 can then be located coincident with or proximal to the beam waists to maximise the effect of peripheral areas of the laser beam being incident on the opposing reflectors other than on the intended reflective facet at each reflection.

In other embodiments, both one or more of the planar reflecting portions, and one or more of the concave reflectors may be provided on each of the first and second reflectors so as to form reflective elements in the path of the laser beam 22.

In FIG. 4, one or more of the one or more partially reflecting facets of FIG. 2 are replaced by one or more partially reflecting planar reflecting portions 118 which may be constructed and which may function in substantially the same way, although embodiments with no partially reflecting portions could be used as shown in FIGS. 1 and 3. Similarly, a spatial filtering mask 15 may also be provided, for example as shown in FIG. 3, in arrangements such as that of FIG. 4 where the laser beam path includes reflections from one or more planar reflecting portions.

Figure 5A:
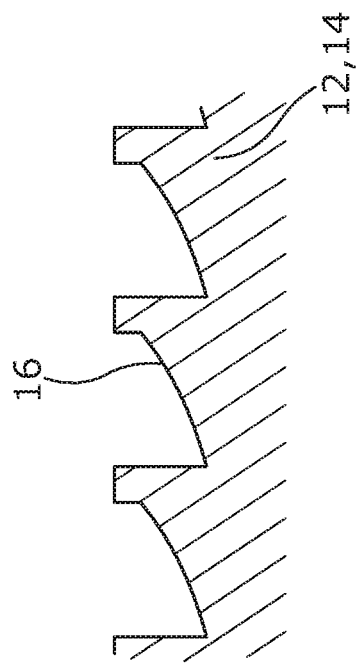
FIGS. 5A to 5D shows in cross section various forms of interstitial transition regions between reflecting facets.

FIGS. 5A to 5D illustrate in cross section some adjacent reflecting facets 16 of a reflector 12 or 14 as discussed herein, showing how boundaries or transitions between adjacent reflecting facets 16 may be formed or structured. In FIG. 5A the facets are not separated by any interstitial surface, and the reflector surface transitions from one facet to an adjacent facet without any significant spacing. The boundary between one facet and another therefore typically takes the form of a step between the facets, although if the adjacent boundaries of two facets happened to be at exactly the same level then no step would be present.

Figure 5B:
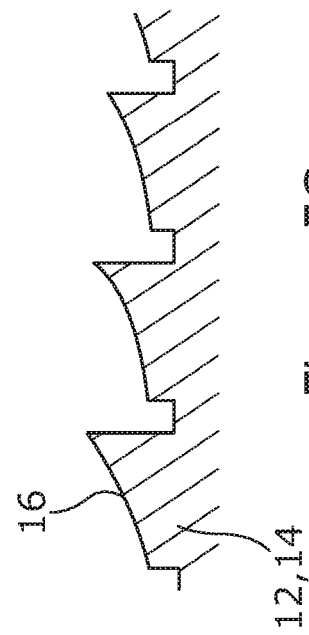
Figure 5C:
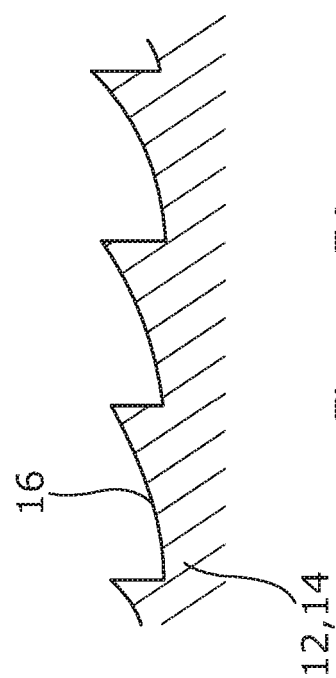

In FIG. 5B adjacent facets are separated by a raised interstitial surface which therefore typically takes the form of a wall structure between adjacent facets with steep or vertical sides and a level, flat, and/or horizontal interstitial surface forming the top of the wall. In FIG. 5C adjacent facets are separated by a lowered interstitial surface which therefore typically takes the form of a trench structure with steep of vertical sides, but again with a level, flat, and/or horizontal interstitial surface forming the base of the trench.

Figure 5D:
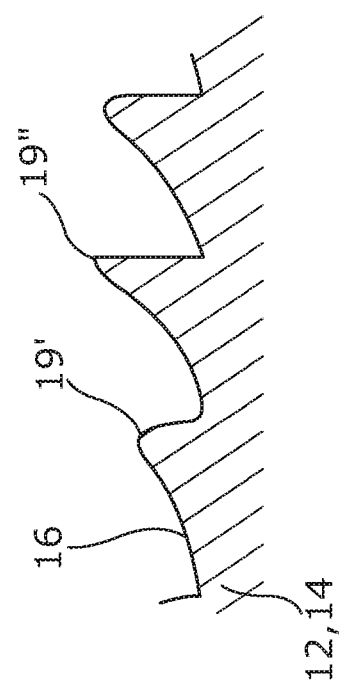

In FIG. 5D a graduated, smooth, or continuous transition between adjacent facets is used to provide a boundary region, without any sharp edge or transition. In the case of boundary 19' both sides of the transition, that is the transition into both of the adjacent facets, is smooth, whereas in the case of boundary 19" one side of the transition is smooth and the other is provided by a sharp edge.

Figure 6:
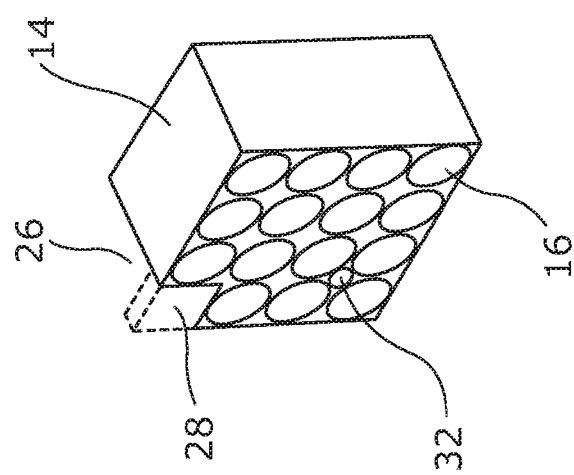
FIG. 6 shows, in perspective view, reflectors comprising reflective facets suitable for use in embodiments such as those of FIGS. 1 to 5D.
Figure 6:
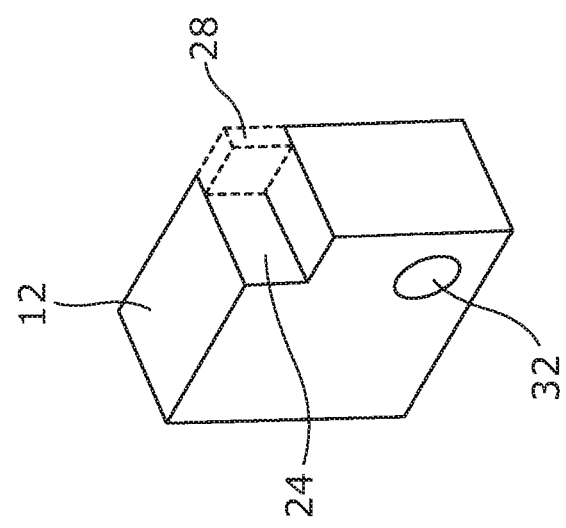

In all of the examples of FIGS. 5A to 5D it should be noted that when considered in plan view, a two dimensional distribution of facets must be considered, for example as shown in FIG. 6. For example the facets may be distributed in a rectilinear or hexagonal grid. If each facet is essentially circular in plan view as shown in FIG. 6 then the interstitial transitions of FIGS. 5A to 5D may be considered to those transitions as viewed in a cross section through which the edges of the facets are at their closest points, and wider transitions of essentially the same or suitably adapted forms may be provided where the edges of the facets are more widely separated. Similarly, if the facets are of a different shape in plan view, such as square, hexagonal, or some other form then the transitions shown in FIGS. 5A to 5D may be considered and modified suitably.

By adopting particular forms of transition boundary between the facets the degree to which stray scattered light affects the performance of the infrared spectrometer can be minimised, for example using suitable modelling procedures. For example, some forms of interstitial boundaries may lead to much less laser beam light either leaving the intended path of the beam, or much less laser beam light which does leave the intended path of the beam from being scattered back into the intended path of the beam leading to a reduction in performance of the spectrometer.

FIG. 6 illustrates in perspective view how the reflectors 12, 14 of the previous figures might be implemented in more detail. In the depicted arrangement each reflector comprises fifteen discrete reflective facets 16 (one or more of which could be a partially transmitting facet 18). These are arranged in a rectilinear grid, although various other numbers and geometric arrangements could be used such as a hexagonal or triangular or somewhat unstructured or random grid. In order to provide a compact sensor, the facets may for example be arranged such that, for each reflector, the facets occupy at least 50% of the area of a face of the reflector which is arranged to face the other reflector.

Each facet is concave. The facets depicted in FIG. 6 are essentially circular in plan view although other shapes could be used such as elliptical, square, hexagonal and so forth as mentioned elsewhere in this document. In FIG. 6 the facets of the first reflector 12 are not visible, but the first reflector 12 in this particular example may be essentially identical to the second reflector, but rotated so that the two reflectors face each other.

With fifteen facets in a four×four grid in the arrangement depicted in FIG. 6, the sixteenth grid position is then used to provide the entry aperture 24 for entrance of the laser beam into, and exit aperture 26 for exit of the laser beam from, the space between the opposing reflectors 12, 14. As illustrated in FIG. 6 each of the entrance and exit apertures may be provided with a window 28 which is suitably transparent to the laser beam while preventing gas or liquid movement through the aperture. Such a window may for example be formed from a crystal or glass material moulded or machined and polished. If required, the transmission properties could be tailored using optical coatings. Example materials include lead chalcogenide glasses, or crystal material such as zinc selenide, calcium fluoride, and barium fluoride. The window could for example be glued in position or inserted using mounting systems.

In the arrangement of FIG. 6, both reflectors 12, 14 may be of the same or similar construction, each comprising a plurality of concave reflecting facets in the path of the laser beam as it reflects alternately between the two reflectors.

Alternatively, as discussed above in connection with FIG. 4, one of the reflectors 12, 14 may instead comprise a single planar reflector (or in some cases a smoothly curved planar portion), or single mirror surface, from which the laser beam reflects multiple times although typically from different points of that reflector. In other alternate arrangements, each of the reflectors may comprise a one or more of the concave reflecting facets, and one or more planar reflective portions, each of which provides for one or more reflections of the laser beam 22.

Although not shown in previous figures, FIG. 6 illustrates that one or both of the reflectors 12, 14 may be provided with one or more ports 32 passing through the particular reflector to permit a sample gas or liquid to flow or be pumped into and/or out of the space between the reflectors. Such ports 32 may be positioned for example between two, three, or more of the reflective facets, and may conveniently make use of area between the facets which is not required for reflection of the laser beam, noting that the laser beam is typically expected to be Gaussian and therefore largely circular or elliptical in cross section.

One, two or more such ports 32 may be formed in either or both of the reflectors, and may be connected to suitable further apparatus such as ducts, pumps and valves for controlling and/or directing the flow of a sample into and through the space between the reflectors 12, 14. In this way, flow of a sample gas or liquid can be arranged to be largely along the direction of spacing between the first and second reflectors, which may be desirable for example to improve homogeneity of the sample between each of the beam paths between reflecting facets. If a sample flow across the direction of spacing was used instead then rapid changes in the sample might affect some beam paths earlier than others, giving rise to less satisfactory sensing performance.

Figure 7:
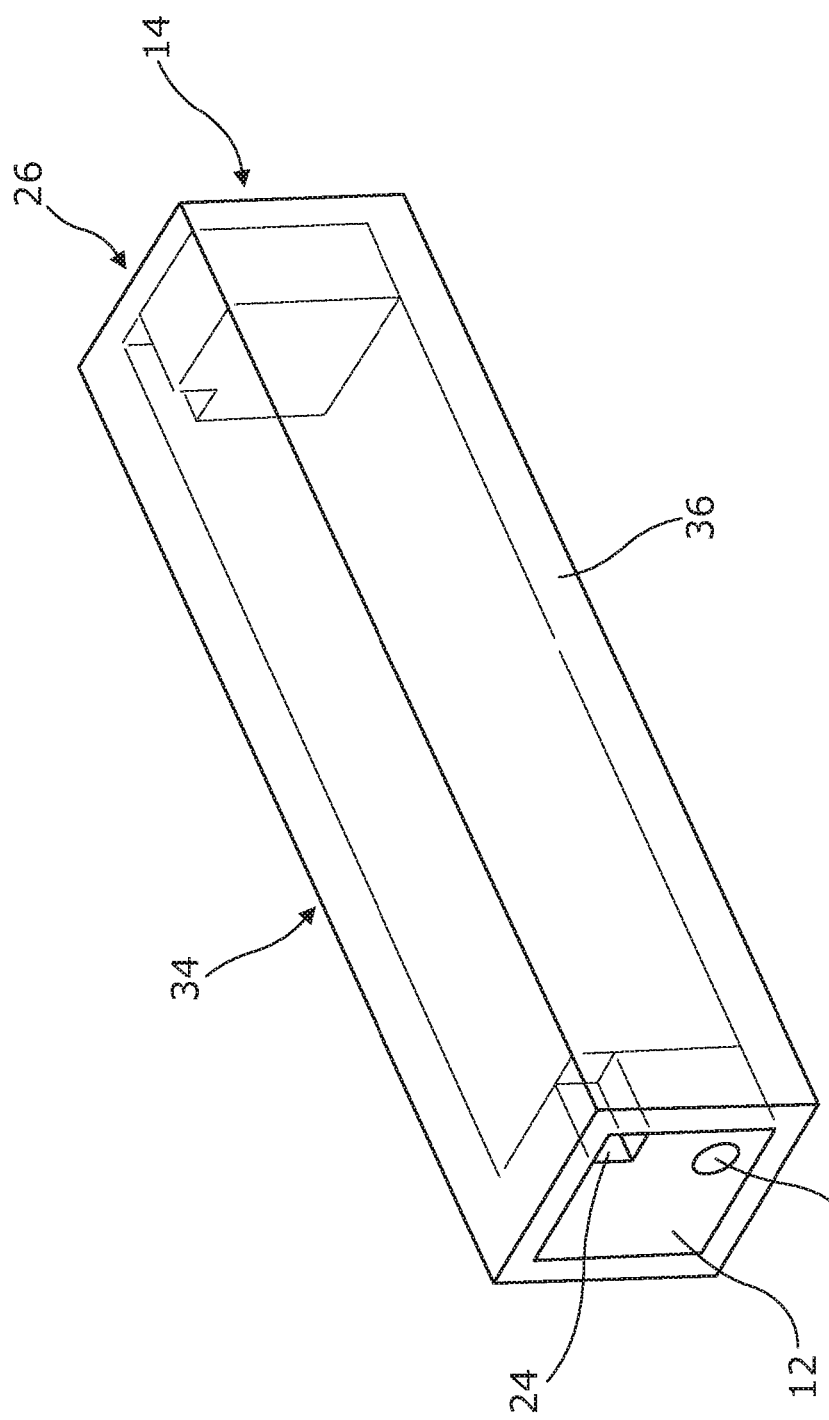
FIG. 7 shows the reflectors of FIG. 6 used to form end walls of a close sample cell.

FIG. 7 shows how opposing reflectors 12, 14 such as those of FIG. 6 may form parts or all of end walls of a sample cell using a cell wall 36 enclosing a space between the opposing reflectors, and how such a sample cell may be used to contain a sample. A sample gas or liquid may then be passed into and out of the sample cell through the ports 24, 26, and/or using other ports for example through the cell wall 34.

Referring back to the discussion of all the figures above, the discrete reflective facets 16 of the reflectors may typically be formed as spherically concave surfaces, although other concave forms which are not exactly spherical, for example being marginally aspheric, may be used. Where a radius of curvature of a reflective facet 16 is discussed herein, that term should be understood accordingly, for example defining the average radius of curvature across the facet, or the radius of curvature at the centre of the facet, to the extent that the facet is not spherical in form.

The geometric forms of the reflective facets 16 may be formed on or in the reflectors in various ways including by milling (for example diamond milling), moulding, ablation (such as laser ablation), and/or replication (which typically involves transferring the optical surface of a 'negative' master, to one or more 'positive' copies or that surface). Additive manufacturing, for example using a 3D printing technique, might also be used, either alone or in combination with another technique. In another alternative, piezo actuated surfaces could be used to provide the reflective facets. Essentially the same techniques may be used to form one or more planar reflective portions on the reflectors as discussed above. If one of the reflectors provides a single reflective surface without any concave facets then various known techniques for forming mirror surfaces may be used.

Each reflector may be formed from any of a variety of materials suitable for forming the facets such as aluminium or other metals, plastics, glasses and ceramics. Suitable coatings may be used on the facet surfaces, and optionally across other parts or the whole of the facing surfaces if the reflectors, for example if the material used to form a reflector is not itself suitable for providing a sufficiently high degree of reflectivity of the facets, or some other variation of the intrinsic optical properties of the underlying material are required.

For each reflector, all of the discrete reflective facets, and any planar reflecting portions, of that reflector may be formed from a single piece of a material or as a single integral unit. More specifically, each reflector may be integrally formed from a single piece of material. In any case however, suitable coatings of one or more different materials may also be applied at least to the reflective facets themselves, and to any planar reflecting portions, and optionally to some or all parts of the opposing faces of the reflectors.

For example, if a reflector is formed by milling then all of the facets of that reflector may be milled onto a single piece of material. If each reflector is formed by moulding then all of the facets of that reflector may be moulded as part of a single piece of material.

Alternatively, each reflector may be formed from multiple sections each of a single piece of material, for example with each section providing one or more of the facets. In such examples, the multiple sections may be formed to abut against each other and may be held together for example by bonding or clamping.

In any of the situations above case, one or more coatings may then be applied for example to improve reflectivity and/or other optical properties, to improve longevity for example through resistance to contamination or chemical damage, and/or for other purposes.

The inventors have conducted numerical modelling experiments to determine optimum geometric parameters for the reflectors and reflective facets in order to minimise loss of laser beam intensity during reflections between the reflectors, and also to minimise overlap of laser beam intensity onto adjacent reflectors, while aiming to provide a more compact form for the multi-pass cell and any apparatus comprising such a cell by minimising the sizes of the facets and the reflectors. To this end, a numerical model was developed which uses an ABCD matrix formulation of ray optics combined with Gaussian beam transformations, for example as described in Chapter 20 of "Lasers" by Anthony E Siegman, University Science Books, 1986.

The numerical model accepts as starting parameters a beam quality factor $M^2$ and a particular waist size of the laser beam before the first facet reflection is assumed, for example as conditioned using conditioning optics 28 shown in FIG. 1. It is also a requirement in the model that this laser beam waist occurs between the reflectors, for example after entry of the laser beam into the space between the reflectors through an entrance aperture 24 as depicted in FIG. 1, although the model then allows this waist position to vary in optimizing other calculated parameters. In the model all reflections from the reflectors were from concave reflecting facets, rather than from any planar reflecting portions being included.

Figure 8:
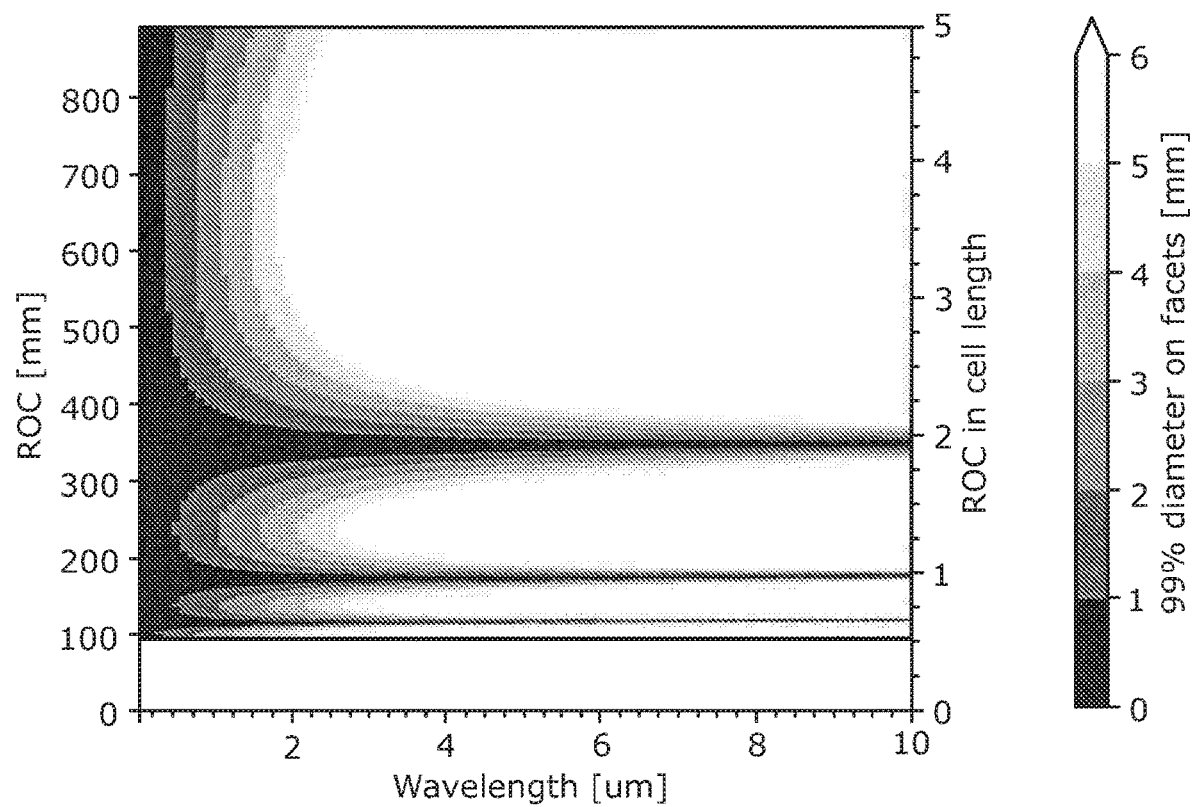
FIG. 8 is a graph showing the diameter of 99% of laser beam intensity at a last reflecting facet as function of wavelength of laser light and radius of curvature of reflective facets.

FIG. 8 shows results of the model for an input laser beam having $M^2=1.2$ and a waist size of 100 μm between the reflectors and before the first facet reflection. The reflector spacing length is 179 mm, and there are six facets at each reflector, each of which is circular with a diameter of 5 mm, in a rectilinear grid with a spacing between the proximal edges of the facets of 0.25 mm. Every other reflection between facets is between exactly opposing facets and therefore along the axis between the reflectors, and the alternate reflections are at a beam angle of about 0.84 degrees between non-opposing (i.e. offset) reflective facets.

In particular, FIG. 8 shows the diameter of 99% of the beam intensity on the last facet from which the laser beam is reflected, as a function of wavelength of the laser beam from 1,000 to 10,000 nm (abscissa), and of radius of curvature of each of the facets (ordinate). The left scale shows the radius of curvature in absolute terms ranging from 0 to 900 mm, and the right scale shows it as a ratio to the spacing length between the two reflectors.

It can be seen that beam diameter at the last facet shows strong minima for particular values of facet radius of curvature which correspond to ½, ⅔, 1, and 2 times the spacing length. These minima extend over the full range of wavelengths tested, although the minima become narrower and deeper at longer wavelengths, which is consistent with the Gaussian nature of the beam becoming more significant for given optical scales at these longer wavelengths.

Figure 9:
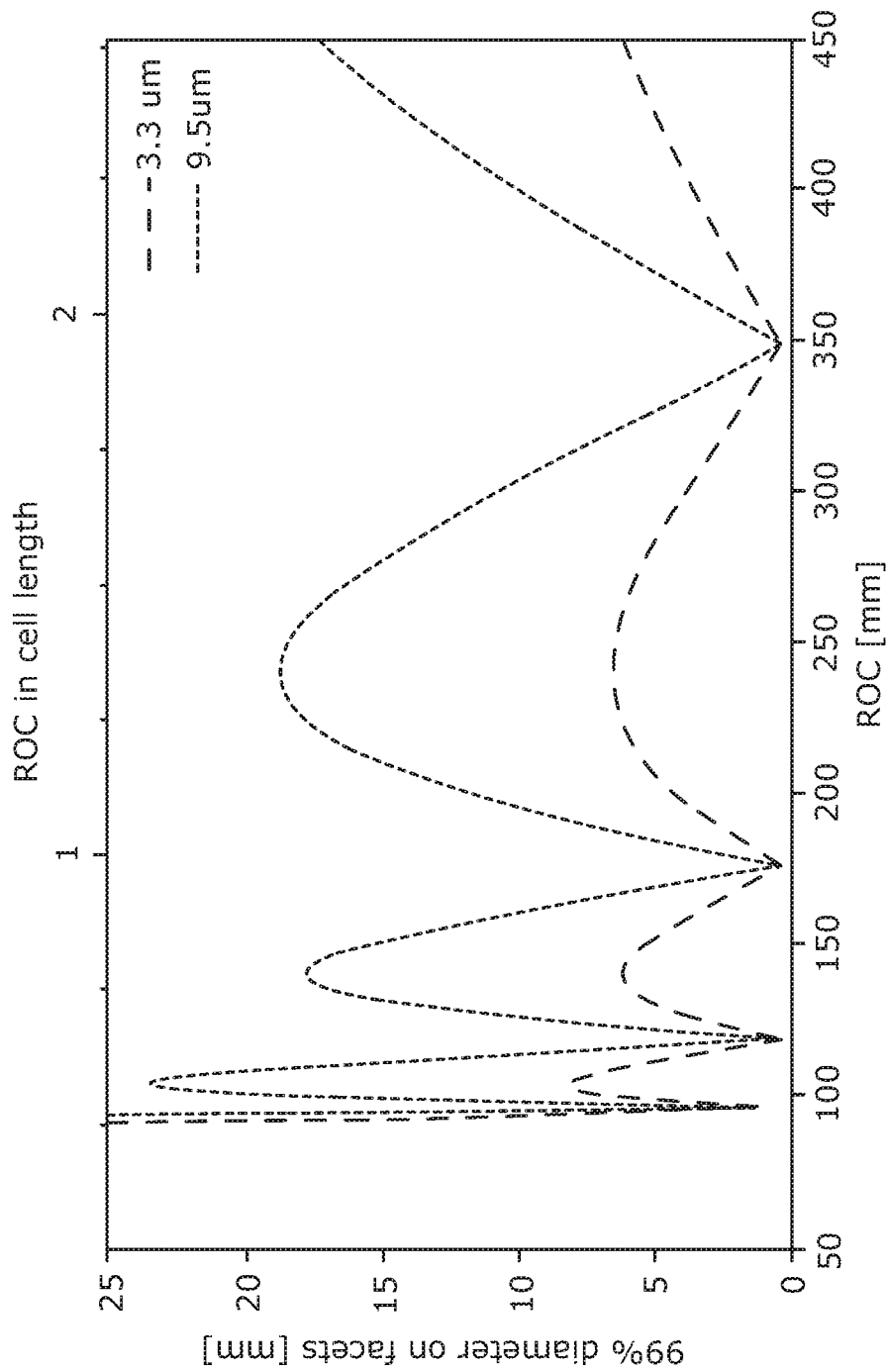
FIG. 9 shows a cross section through the graph of FIG. 8 for two particular wavelengths.

FIG. 9 shows cross sections through the plot of FIG. 8, chosen at wavelengths of 3300 and 9500 nm. The 99% beam diameter at the last facet is clearly seen to show the strong minima when the radius of curvature is at or close to a multiple of ½, ⅔, 1, and 2 times the spacing length as mentioned above. Although the minima in beam diameter are seen at these radii of curvature, it may be observed that reasonable performance in terms of a small beam diameter is seen within about +−10% of these multiples (and more optimally within about +−5% of these multiples) for example between radii of curvature of about 160 and 197 mm for the multiple of 1 times the spacing length. Between the minima in beam width as a function of radius of curvature of the facets, the increase in beam width is much more marked for longer wavelengths, extending to roughly 6-7 mm for the 3,300 nm laser beam, and roughly 20 mm for the 9500 nm laser beam.

These results, which are found to be largely consistent across other laser beam parameters of $M^2$, beam waist width, reflector spacing, and other parameters such as number of reflecting facets, enable design of an infrared absorption sensor embodying the invention in which smaller diameter reflective facets can be used without significant extra beam intensity loss, thereby providing for a more compact apparatus. Reflector designs using radius of curvature of facets being ⅔ times the spacing length between the reflectors is a minimum of rather narrow width, especially at longer wavelengths, requiring high tolerances for manufacture and positioning of the reflectors and the conditioning optics. Reflector designs with radius of curvature ½ of the spacing length require yet finer tolerances and alignment, and so are again potentially more difficult to use.

Reflector designs with radius of curvature of about 1 or 2 times the spacing length are more convenient to implement because the minima in beam size at the facets are broader so less subject to manufacturing tolerances. In the case of radius of curvature of about 1 times the spacing length the re-imaging and therefore the beam waist takes place in the centre of the cell. This also has advantages of allowing the use of a spatial filter mask as already described above and illustrated in FIG. 3. In the case of radius of curvature of about 2 times the spacing length the re-imaging and therefore the beam waist takes place either in the centre of the cell of on the facets for optimized arrangements.

Similar modelling by the inventors also indicates that it can be advantageous in terms of reducing facet size and reducing laser beam loss and overlap to ensure that the reflecting facets are designed and arranged such that the laser beam forms a plurality of beam waists in reflections between concave facets of the first and second opposing reflectors, each of the beam waists being positioned at or towards the centre between subsequent reflecting facets. For example, the sensor may be arranged such that some or all of the beam waists are spaced from both of the reflectors by at least 10%, and more preferably by at least 20% or at least 30% of the spacing length. As discussed above, positioning of beam waists between the reflectors allows for the use of a spatial filter mask close to or coincident with those beam waists, where the mask is arranged to reduce or eliminate incidence of the beam on the reflector but outside of the next intended reflecting facet.

Where the laser beam is reflected from a concave facet on a first of the reflectors to a planar reflecting portion on the opposing reflector, and thereafter back to a concave facet on the first reflector, the above modelling indicates that the curvature of the concave facets may equivalently be optimised at about twice the above values, that is at around multiples of 4/3, 2 and 4 times the spacing length, for example within about +−10% of such multiples.

Similarly, where planar reflecting portions are used, it can be advantageous in terms of reducing facet size and reducing laser beam loss and overlap to ensure that the reflecting facets are designed and arranged such that the laser beam forms a beam waist positioned at or proximal to the planar reflecting portion, for example within 10% or within 20% of the spacing length from that planar reflecting portion. If an arrangement is used where all of the concave facets are provided on a first one of the reflectors, then the apparatus may be arranged such that all of the beam waists occur at or proximal to the other, second reflector. In such a case a spatial filter mask may be provided at or close to the second reflector so as to be close to or coincident with the beam waists at the second reflector, the mask being arranged to reduce or eliminate incidence of the beam on portions of the first reflector which are outside of the next intended reflecting facet.

Although particular embodiments of the invention have been described, it will be apparent to the person skilled in the art that a variety of changes and modifications can be made without departing from the scope of the invention as defined by the claims. For example, the described arrangement of opposing reflectors each comprising a plurality of concave facets may be used for other purposes apart from the discussed infrared absorption spectrometer, such as to provide an optical delay path for various purposes, with application areas including telecommunications, spectrometry within various infrared and other spectral regions, and in other fields.

The invention claimed is:

1. An infrared spectrometer comprising:
   first and second opposing reflectors spaced apart by a spacing length;
   a plurality of discrete concave reflecting facets, the concave reflecting facets being facets of the opposing reflectors;
   an infrared laser source arranged to form a laser beam;
   the opposing reflectors being arranged such that the laser beam is reflected alternately from each of the opposing reflectors, including being reflected at least once by each of the concave reflecting facets;
   a detector arranged to detect spectral properties of the laser beam after reflection from each of the plurality of concave reflecting facets; and an analyser arranged to determine properties of a sample disposed between the first and second opposing reflectors from the detected spectral properties, wherein the laser beam reflects alternately from a concave reflecting facet of each of the opposing reflectors, and each of a plurality of the concave reflecting facets which reflects the laser beam to a concave reflecting facet of the opposing reflector has a radius of curvature which is within ±10% of a multiple of the spacing length, wherein the multiple is one of: ⅔, 1 and 2; and wherein at least one of the concave reflecting facets is partially reflecting so that following reflection from a first subset of the concave reflecting facets:

a first portion of the laser beam continues on to reflection from a second subset of the concave reflecting facets and subsequent detection by the detector; and a second portion of the laser beam is transmitted through the partially reflecting concave reflecting facet for detection by the, or another, detector after reflection from only the first subset of the concave reflecting facets.

2. The infrared spectrometer of claim 1 wherein the number of said concave reflecting facets, from which the laser beam is reflected at least once, is at least six, and optionally no more than one hundred or optionally no more than 400.

3. The infrared spectrometer of claim 1 arranged such that each of the reflections of the laser beam before a subsequent reflection from the opposing reflector is a reflection from a concave reflecting facet.

4. The infrared spectrometer of claim 1 wherein at least some of the concave reflecting facets are configured such that the laser beam forms a beam waist between reflection from such a concave reflecting facet and the next reflection, the next reflection being from a concave reflecting facet of the opposing reflector.

5. The infrared spectrometer of claim 4, wherein each such beam waist is spaced from both of the opposing reflectors by at least 10%, and more preferably by at least 20% of the spacing length.

6. The infrared spectrometer of claim 1 further comprising conditioning optics arranged to form a waist in the laser beam before a first reflection from either of the opposing reflectors.

7. The infrared spectrometer of claim 1 wherein each concave reflecting facet has a diameter of from 1 to 6 mm.

8. The infrared spectrometer of claim 1 wherein the laser beam has a wavelength of between 2000 and 20,000 nm.

9. The infrared spectrometer of claim 1 wherein the concave reflecting facets are arranged such that the laser beam is reflected once and only once from each of the plurality of the concave reflecting facets.

10. The infrared spectrometer of claim 1 wherein the first and second subsets of concave reflecting facets are mutually exclusive.

11. The infrared spectrometer of claim 1 further comprising a spatial filtering mask located between the opposing reflectors, the spatial filtering mask comprising a plurality of apertures each arranged to permit at least a portion of the laser beam directed to the corresponding next concave reflecting facet in the path of the laser beam to arrive at that next concave reflecting facet, the spatial filtering mask being arranged to block at least a portion of the laser beam which would otherwise be incident outside that next concave reflecting facet.

12. The infrared spectrometer of claim 11 wherein the concave reflecting facets and spatial filtering mask are configured such that the laser beam forms a plurality of beam waists during reflection between the first and second reflectors which are at or proximal to the spatial filtering mask.

13. The infrared spectrometer of claim 1 wherein, for each of one or both of the opposing reflectors, all of the concave reflecting facets are formed on a single piece of a material.

14. The infrared spectrometer of claim 1 wherein some or all of the concave reflecting facets are coated with a reflective coating.

15. The infrared spectrometer of claim 1 wherein the concave reflecting facets are formed by one of: moulding, diamond milling, laser ablation, and replication.

16. The infrared spectrometer of claim 1 comprising a sample cell arranged to contain the sample between the first and second opposing reflectors.

17. The infrared spectrometer of claim 16 wherein one or both of the opposing reflectors comprises one or more ports arranged for the sample to flow into and/or out of the sample cell.

18. The infrared spectrometer of claim 17 wherein each of the opposing reflectors comprises one or more said ports, and the infrared spectrometer is arranged to cause the sample to flow into the sample gas cell through the one or more ports in one of the reflectors, and out of the cell through the one or more ports in the other of the reflectors.

19. A method of operating an infrared spectrometer comprising:

providing first and second opposing reflectors spaced apart by a spacing length;

providing a plurality of concave reflecting facets, each of the concave reflecting facets being a facet of a said reflector;

providing a sample in a space between the opposing reflectors;

directing an infrared laser beam to pass through the sample multiple times by reflecting at least once from each of a plurality of the concave reflecting facets, the laser beam reflecting alternately from each of the opposing reflectors, including being reflected at least once by each of the concave reflecting facets;

detecting spectral properties of the laser beam following the multiple reflections; and determining properties of the sample from the detected spectral properties, wherein the laser beam reflects alternately from a concave reflecting facet of each of the opposing reflectors, and each of a plurality of the concave reflecting facets which reflects the laser beam to a concave reflecting facet of the opposing reflector, has a radius of curvature which is within ±10% of a multiple of the spacing length, wherein the multiple is one of: ⅔, 1 and 2; and wherein at least one of the concave reflecting facets is partially reflecting so that a first portion of the laser beam continues on to reflection from a second subset of the concave reflecting facets and subsequent detection by the detector, and second portion of the laser beam is transmitted through the partially reflecting concave reflecting facet for detection by the, or another, detector after reflection from only a first subset of the reflecting facets.

20. The method of claim 19 wherein the number of concave reflecting facets, from which the laser beam is reflected at least once, is at least six, and optionally no more than sixty or no more than 100, or no more than 400.

21. The method of claim 19 wherein each concave reflecting facet has a diameter of from 1 to 6 mm.

22. An infrared spectrometer comprising:
first and second opposing reflectors spaced apart by a spacing length;
a plurality of discrete concave reflecting facets, the concave reflecting facets being facets of at least one of the opposing reflectors;
one or more planar reflecting surfaces disposed on at least one of the opposing reflectors;
an infrared laser source arranged to form a laser beam;
the opposing reflectors being arranged such that the laser beam is reflected alternately from each of the opposing reflectors, including being reflected at least once by each of the concave reflecting facets;
a detector arranged to detect spectral properties of the laser beam after reflection from each of the plurality of concave reflecting facets; and
an analyser arranged to determine properties of a sample disposed between the first and second opposing reflectors from the detected spectral properties,
wherein all of the concave reflecting facets are disposed on only one of the opposing reflectors, and the reflections of the laser beam at the other, opposing reflector are from said one or more planar reflecting portions of that other, opposing reflector.

23. The infrared spectrometer of claim 22 wherein the number of said concave reflecting facets, from which the laser beam is reflected at least once, is at least six, and optionally no more than one hundred or optionally no more than 400.

24. The infrared spectrometer of claim 22 wherein the one or more planar reflecting portions of the other, opposing reflector are provided by a single planar surface.

25. The infrared spectrometer of claim 22 wherein at least some of the concave reflecting facets are configured such that the laser beam forms a beam waist at or proximal to the next reflection, the next reflection being from a said planar reflecting portion of the opposing reflector, wherein proximal to the opposing reflector is optionally within 20%, or optionally within 10% of the spacing length from that opposing reflector.

26. The infrared spectrometer of claim 22 further comprising conditioning optics arranged to form a waist in the laser beam before a first reflection from either of the opposing reflectors.

27. The infrared spectrometer of claim 22 wherein each concave reflecting facet has a diameter of from 1 to 6 mm and wherein the laser beam has a wavelength of between 2000 and 20,000 nm.

28. The infrared spectrometer of claim 22 further comprising a spatial filtering mask located between the opposing reflectors, the spatial filtering mask comprising a plurality of apertures each arranged to permit at least a portion of the laser beam directed to the corresponding next concave reflecting facet in the path of the laser beam to arrive at that next concave reflecting facet, the spatial filtering mask being arranged to block at least a portion of the laser beam which would otherwise be incident outside that next concave reflecting facet.

29. The infrared spectrometer of claim 22 wherein, for each of one or both of the opposing reflectors, all of the concave reflecting facets are formed on a single piece of a material.

30. The infrared spectrometer of claim 22 comprising a sample cell arranged to contain the sample between the first and second opposing reflectors, wherein one or both of the opposing reflectors comprises one or more ports arranged for the sample to flow into and/or out of the sample cell.

31. The infrared spectrometer of claim 22 wherein each of a plurality of the concave reflecting facets which reflects the laser beam to a said planar reflecting surface of the opposing reflector for reflection back to another of the concave reflecting facets, has a radius of curvature which is within ±10% of a multiple of the spacing length, wherein the multiple is one of: 4/3, 2 and 4.

32. A method of operating an infrared spectrometer comprising:
providing first and second opposing reflectors spaced apart by a spacing length;
providing a plurality of concave reflecting facets, each of the concave reflecting facets being a facet of a said reflector;
providing one or more planar reflecting surfaces disposed on at least one of the opposing reflectors;
providing a sample in a space between the opposing reflectors;
directing an infrared laser beam to pass through the sample multiple times by reflecting at least once from each of a plurality of the concave reflecting facets, the laser beam reflecting alternately from each of the opposing reflectors, including being reflected at least once by each of the concave reflecting facets;
detecting spectral properties of the laser beam following the multiple reflections; and
determining properties of the sample from the detected spectral properties,
wherein the concave reflecting facets are all facets of a first one of the opposing reflectors, and reflections of the laser beam from the other one of the opposing reflectors are reflections from said one or more planar reflecting portions of that other opposing reflector.

33. The method of claim 32 wherein the number of concave reflecting facets, from which the laser beam is reflected at least once, is at least six, and optionally no more than sixty or no more than 100, or no more than 400.

34. The method of claim 32 wherein each concave reflecting facet has a diameter of from 1 to 6 mm.

35. The method of claim 32 wherein each of a plurality of the concave reflecting facets which reflects the laser beam to a planar reflecting surface of the opposing reflector for reflection back to another of the concave reflecting facets, has a radius of curvature which is within ±10% of a multiple of the spacing length, wherein the multiple is one of: 4/3, 2 and 4.

36. An infrared spectrometer comprising:
first and second opposing reflectors spaced apart by a spacing length;
a plurality of discrete concave reflecting facets, the concave reflecting facets being facets of the opposing reflectors;
an infrared laser source arranged to form a laser beam;
the opposing reflectors being arranged such that the laser beam is reflected alternately from each of the opposing reflectors, including being reflected at least once by each of the concave reflecting facets;
a detector arranged to detect spectral properties of the laser beam after reflection from each of the plurality of concave reflecting facets; and
an analyser arranged to determine properties of a sample disposed between the first and second opposing reflectors from the detected spectral properties; and
a spatial filtering mask located between the opposing reflectors, the spatial filtering mask comprising a plurality of apertures each arranged to permit at least a portion of the laser beam directed to the corresponding next concave reflecting facet in the path of the laser beam to arrive at that next concave reflecting facet, the spatial filtering mask being arranged to block at least a portion of the laser beam which would otherwise be incident outside that next concave reflecting facet.

37. An infrared spectrometer comprising:

first and second opposing reflectors spaced apart by a spacing length;

a plurality of discrete concave reflecting facets, the concave reflecting facets being facets of at least one of the opposing reflectors;

one or more planar reflecting surfaces disposed on at least one of the opposing reflectors;

an infrared laser source arranged to form a laser beam;

the opposing reflectors being arranged such that the laser beam is reflected alternately from each of the opposing reflectors, including being reflected at least once by each of the concave reflecting facets;

a detector arranged to detect spectral properties of the laser beam after reflection from each of the plurality of concave reflecting facets;

an analyser arranged to determine properties of a sample disposed between the first and second opposing reflectors from the detected spectral properties; and a spatial filtering mask located between the opposing reflectors, the spatial filtering mask comprising a plurality of apertures each arranged to permit at least a portion of the laser beam directed to the corresponding next concave reflecting facet in the path of the laser beam to arrive at that next concave reflecting facet, the spatial filtering mask being arranged to block at least a portion of the laser beam which would otherwise be incident outside that next concave reflecting facet.

* * * * *